(12) United States Patent
Vandermeijden

(10) Patent No.: US 10,572,081 B2
(45) Date of Patent: Feb. 25, 2020

(54) FORCE SENSING USING SENSOR ELECTRODES OF DIFFERENT MATERIALS

(71) Applicant: SYNAPTICS INCORPORATED, San Jose, CA (US)

(72) Inventor: Tom Vandermeijden, Los Gatos, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 98 days.

(21) Appl. No.: 15/653,372

(22) Filed: Jul. 18, 2017

(65) Prior Publication Data
US 2019/0025955 A1    Jan. 24, 2019

(51) Int. Cl.
| | | |
|---|---|---|
| G06F 3/045 | (2006.01) | |
| G06F 3/044 | (2006.01) | |
| G06F 3/041 | (2006.01) | |
| G06F 3/0481 | (2013.01) | |
| G06F 3/0488 | (2013.01) | |

(52) U.S. Cl.
CPC ............ *G06F 3/044* (2013.01); *G06F 3/0416* (2013.01); *G06F 3/04817* (2013.01); *G06F 3/04886* (2013.01); *G06F 3/0414* (2013.01)

(58) Field of Classification Search
None
See application file for complete search history.

(56) References Cited

U.S. PATENT DOCUMENTS

| | | | | |
|---|---|---|---|---|
| 2016/0062517 | A1* | 3/2016 | Meyer | G06F 3/0414 345/173 |
| 2017/0277296 | A1* | 9/2017 | Reynolds | G06F 3/044 |
| 2019/0129557 | A1* | 5/2019 | Liu | G06F 3/041 |

OTHER PUBLICATIONS

Rasia, et al. "Piezoresisitive Response of ITO films deposited at room Temperture by Magnetron Sputtering". 11th International Conference on Advnace Materials Rio De Janeiro Brazil, Sep. 20-25, 2009 <http://www.sbpmat.org.br/icam2009dir/submission/autor/arquivos/I560.pdf>.
Rasia, et al., "Piezoresisitive Response of ITO films deposited at room Temperture by Magnetron Sputtering", Research Gate, Article in Journal of Materials Science • Aug. 2010, Available from: Luiz Antonio Rasia Retrieved on: Oct. 22, 2015.

\* cited by examiner

*Primary Examiner* — Carl Adams
(74) *Attorney, Agent, or Firm* — Patterson + Sheridan, LLP

(57) ABSTRACT

A method and associated processing system and input device are disclosed, the method comprising acquiring capacitive measurements using individual electrodes of a plurality of first sensor electrodes and a plurality of second sensor electrodes. The first sensor electrodes are formed of a first material having a positive gauge factor, and the second sensor electrodes are formed of a second material having a negative gauge factor. The method further comprises selectively forming one or more bridge circuits using the first sensor electrodes and the second sensor electrodes; and acquiring force measurements using the one or more bridge circuits.

20 Claims, 8 Drawing Sheets

FORCE SENSING USING SENSOR ELECTRODES OF DIFFERENT MATERIALS

BACKGROUND

Field

Embodiments disclosed herein generally relate to electronic devices, and more specifically, techniques for performing force sensing using sensor electrodes of different materials.

Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

One embodiment described herein is an input device comprising a plurality of first sensor electrodes formed of a first material having a positive gauge factor; a plurality of second sensor electrodes formed of a second material having a negative gauge factor; and a processing system. The processing system is configured to: acquire capacitive measurements using individual electrodes of the first sensor electrodes and the second sensor electrodes; selectively form one or more bridge circuits using the first sensor electrodes and the second sensor electrodes; and acquire force measurements using the one or more bridge circuits.

Another embodiment described herein is a processing system comprising a sensor module comprising sensor circuitry, the sensor module configured to acquire capacitive measurements using individual electrodes of a plurality of first sensor electrodes and a plurality of second sensor electrodes. The first sensor electrodes are formed of a first material having a positive gauge factor, and the second sensor electrodes are formed of a second material having a negative gauge factor. The sensor module is further configured to selectively form one or more bridge circuits using the first sensor electrodes and the second sensor electrodes; and acquire force measurements using the one or more bridge circuits.

Another embodiment described herein is a method comprising acquiring capacitive measurements using individual electrodes of a plurality of first sensor electrodes and a plurality of second sensor electrodes. The first sensor electrodes are formed of a first material having a positive gauge factor, and the second sensor electrodes are formed of a second material having a negative gauge factor. The method further comprises selectively forming one or more bridge circuits using the first sensor electrodes and the second sensor electrodes; and acquiring force measurements using the one or more bridge circuits.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments, and are therefore not to be considered limiting of inventive scope, as the disclosure may admit to other equally effective embodiments.

Figure 1:
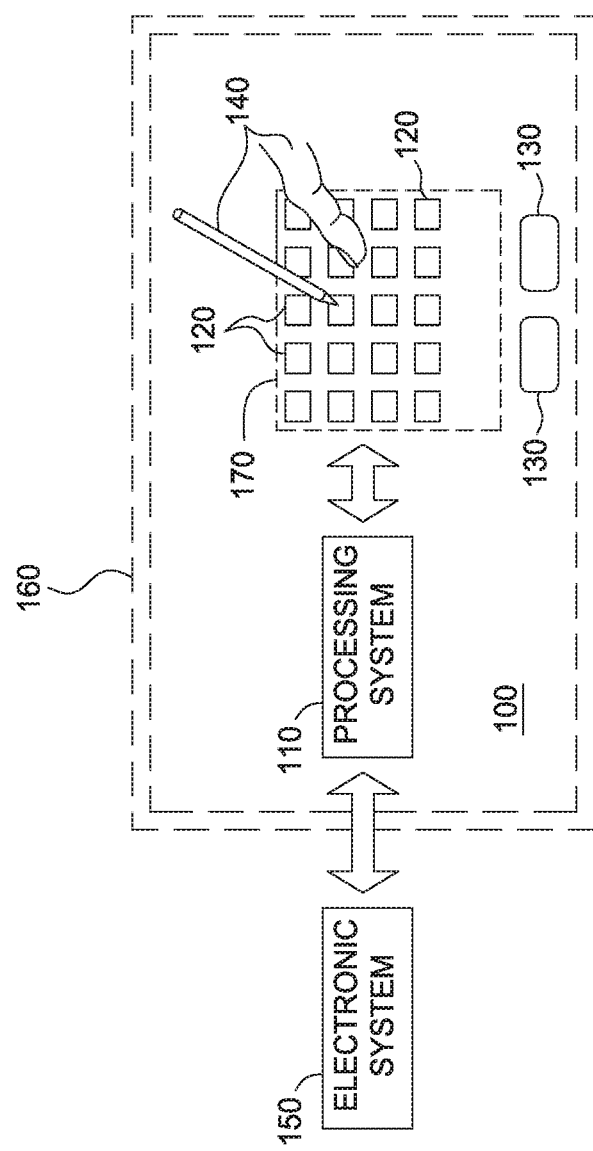
FIG. 1 is a schematic block diagram of an input device, according to embodiments described herein.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the disclosure or the application and uses of the disclosure. Furthermore, there is no intention to be bound by any expressed or implied theory presented in the preceding background, summary, or the following detailed description.

Various embodiments of the present disclosure provide input devices and methods for improving usability. An input device may include electrodes that are operated as sensor electrodes to detect interaction between the input device and an input object (e.g., a stylus or a user's finger). The input device generally drives sensing signals onto the sensor electrodes to acquire capacitive measurements and/or force measurements corresponding to a sensing region.

For input devices such as smart phones and tablets, an increased display screen size generally corresponds to an increased sensing region. However, to maintain portability of the input devices, it can be beneficial to reduce bezel sizes for a particular form factor, such that the display screen occupies a larger proportion of a surface of the input device. However, a reduced bezel size can correspond to a loss of physical buttons (e.g. a "home" button) and a potential reduction of functionality of the input device.

In some embodiments, virtual buttons displayed on the display screen may be used to simulate the functionality of the physical buttons. The virtual buttons may be selectively displayed on the display and may be responsive to force measurements. In some embodiments, the force measurements are acquired using sensor electrodes that are also configured to perform capacitive sensing. In some cases, existing sensor electrode implementations may be used to provide the virtual button functionality, without requiring significant changes to the sensor electrode patterns and/or layers of the input device.

When performing force sensing using capacitive sensor electrodes, temperature drift can be a technical challenge to acquiring accurate strain measurements. For example, temperature changes occurring within the duration of a finger press can cause the press to be "lost." Stated another way, even though the finger is continuing to press on the input device, the press is no longer electronically detected by the input device. Temperature compensation using firmware provides one partial (limited) solution to temperature drift.

According to various embodiments discussed herein, an input device comprises a plurality of first sensor electrodes formed of a first material having a positive gauge factor, and a plurality of second sensor electrodes formed of a second material having a negative gauge factor. A processing system is configured to acquire capacitive measurements using individual electrodes of the first sensor electrodes and the second sensor electrodes, to selectively form one or more bridge circuits using the first sensor electrodes and the second sensor electrodes, and to acquire force measurements using the one or more bridge circuits.

The first sensor electrodes and the second sensor electrodes are responsive to both force and temperature. Because the first sensor electrodes and the second sensor electrodes are responsive to temperature, temperature compensation may be achieved within the bridge circuit. Additionally, because the first sensor electrodes and the second sensor electrodes have gauge factors with opposing polarities, the bridge circuit has an increased force sensitivity, when compared to acquiring force measurements with sensor electrodes of a single material.

Exemplary Input Device Implementations

FIG. 1 is a schematic block diagram of an input device 100, in accordance with embodiments of the present technology. In various embodiments, input device 100 comprises a display device integrated with a sensing device. The input device 100 may be configured to provide input to an electronic system 150. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Example communication protocols include Inter-Integrated Circuit (I$^2$C), Serial Peripheral Interface (SPI), Personal System/2 (PS/2), Universal Serial Bus (USB), Bluetooth®, Radio Frequency (RF), and Infrared Data Association (IrDA) communication protocols.

In FIG. 1, the input device 100 is shown as a proximity sensor device (also often referred to as a "touchpad" or a "touch sensor device") configured to sense input provided by one or more input objects 140 in a sensing region 170. Example input objects include fingers and styli, as shown in FIG. 1.

Sensing region 170 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 170 extends from a surface of the input device 100 in one or more directions into space until signal-to-noise ratios prevent sufficiently accurate object detection. The distance to which this sensing region 170 extends in a particular direction, in various embodiments, may be on the order of less than a millimeter, millimeters, centimeters, or more, and may vary significantly with the type of sensing technology used and the accuracy desired. Thus, in some embodiments, sensing input may comprise no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 170 has a rectangular shape when projected onto an input surface of the input device 100.

The input device 100 may utilize any combination of sensor components and sensing technologies to detect user input in the sensing region 170. The input device 100 comprises a plurality of sensor electrodes 120 for detecting user input. The input device 100 may include one or more sensor electrodes 120 that are combined to form sensor electrodes. As several non-limiting examples, the input device 100 may use capacitive, elastive, resistive, inductive, magnetic acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensor electrodes 120 pickup loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensor electrodes 120 to create electric fields. In some capacitive implementations, separate sensor electrodes 120 may be ohmically shorted together to form larger sensor electrodes. Some capacitive implementations utilize resistive sheets, which may be uniformly resistive.

As discussed above, some capacitive implementations utilize "self-capacitance" (or "absolute capacitance") sensing methods based on changes in the capacitive coupling between sensor electrodes 120 and an input object. In one embodiment, processing system 110 is configured to drive a voltage with known amplitude onto the sensor electrode 120 and measure the amount of charge required to charge the sensor electrode to the driven voltage. In other embodiments, processing system 110 is configured to drive a known current and measure the resulting voltage. In various embodiments, an input object near the sensor electrodes 120 alters the electric field near the sensor electrodes 120, thus changing the measured capacitive coupling. In one implementation, an absolute capacitance sensing method operates by modulating sensor electrodes 120 with respect to a reference voltage (e.g. system ground) using a modulated signal, and by detecting the capacitive coupling between the sensor electrodes 120 and input objects 140.

Additionally as discussed above, some capacitive implementations utilize "mutual capacitance" (or "transcapacitance") sensing methods based on changes in the capacitive coupling between sensing electrodes. In various embodiments, an input object 140 near the sensing electrodes alters the electric field between the sensing electrodes, thus changing the measured capacitive coupling. In one implementation, a transcapacitive sensing method operates by detecting the capacitive coupling between one or more transmitter sensing electrodes (also "transmitter electrodes") and one or more receiver sensing electrodes (also "receiver electrodes") as further described below. Transmitter sensing electrodes may be electrically modulated relative to a reference voltage (e.g., system ground) to transmit a transmitter signals. Receiver sensing electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensing electrodes may be dedicated transmitter electrodes or receiver electrodes, or may be configured to both transmit and receive.

In FIG. 1, the processing system 110 is shown as part of the input device 100. The processing system 110 is configured to operate the hardware of the input device 100 to detect input in the sensing region 170. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes. In some embodiments, the processing system 110 also comprises electronically-readable instructions, such as firmware code, software code, and/or the like. In some embodiments, components composing the processing system 110 are located together, such as near sensor electrode(s) 120 of the input device 100. In other embodiments, components of processing system 110 are physically separate with one or more components close to sensor electrode(s) 120 of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a mobile device such as a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensor electrodes 120 to detect input, identification modules configured to identify gestures such as mode changing gestures, and mode changing modules for changing operation modes. Processing system 110 may also comprise one or more controllers.

In some embodiments, the processing system 110 responds to user input (or lack of user input) in the sensing region 170 directly by causing one or more actions. Example actions include changing operation modes, as well as graphical user interface (GUI) actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensor electrode(s) 120 of the input device 100 to produce electrical signals indicative of input (or lack of input) in the sensing region 170. The processing system 110 may perform any appropriate amount of processing on the electrical signals in producing the information provided to the electronic system. For example, the processing system 110 may digitize analog electrical signals obtained from the sensor electrodes 120. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 170, or some other functionality. FIG. 1 shows buttons 130 near the sensing region 170 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 170 overlaps at least part of an active area of a display screen of the display device 160. For example, the input device 100 may comprise substantially transparent sensor electrodes 120 overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display device 160 may share physical elements. For example, some embodiments may utilize some of the same electrical components for displaying and sensing. As another example, the display device 160 may be operated in part or in total by the processing system 110.

It should be understood that while many embodiments of the present technology are described in the context of a fully functioning apparatus, the mechanisms of the present technology are capable of being distributed as a program product (e.g., software) in a variety of forms. For example, the mechanisms of the present technology may be implemented and distributed as a software program on information bearing media that are readable by electronic processors (e.g., non-transitory computer-readable and/or recordable/writable information bearing media readable by the processing system 110). Additionally, the embodiments of the present technology apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Exemplary Sensor Electrode Implementations

Figure 2:
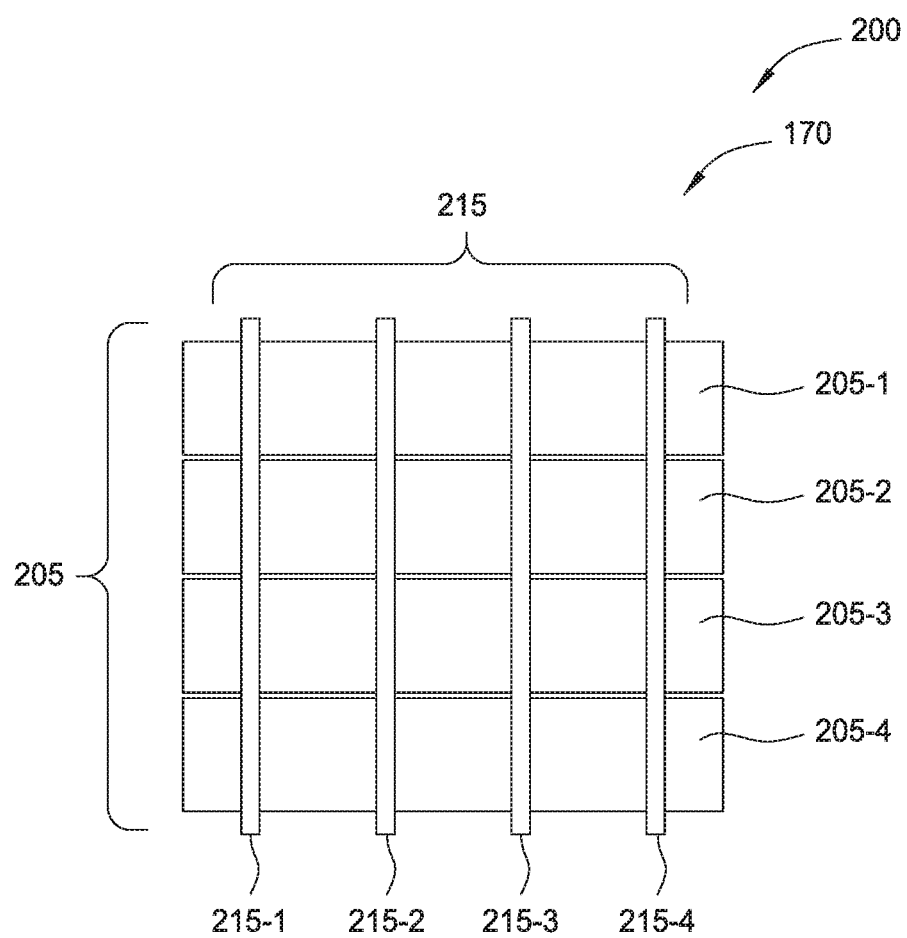
FIGS. 2 and 3 illustrate portions of exemplary sensor electrode implementations, according to embodiments described herein.
Figure 3:
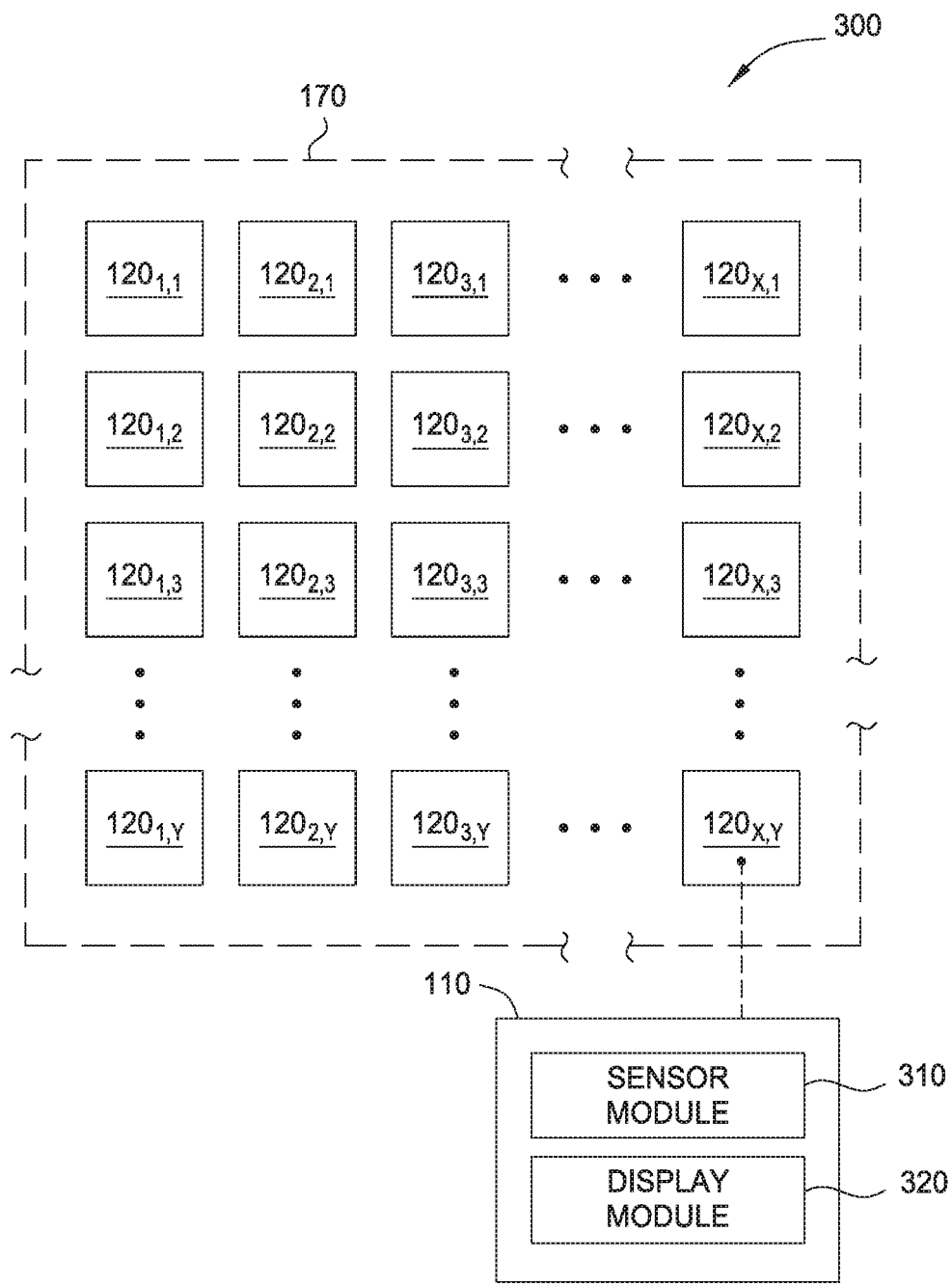

FIGS. 2 and 3 illustrate portions of exemplary sensor electrode arrangements, according to embodiments described herein. Specifically, arrangement 200 (FIG. 2) illustrates a portion of a pattern of sensor electrodes configured to sense in a sensing region 170 associated with the pattern, according to several embodiments. For clarity of illustration and description, FIG. 2 shows the sensor electrodes in a pattern of simple rectangles, and does not show various associated components. This pattern of sensing electrodes comprises a first plurality of sensor electrodes 205 (e.g., 205-1, 205-2, 205-3, 205-4), and a second plurality of sensor electrodes 215 (e.g., 215-1, 215-2, 215-3, 215-4). The sensor electrodes 205, 215 are each examples of the sensor electrodes 120 discussed above. In one embodiment, processing system 110 operates the first plurality of sensor electrodes 205 as a plurality of transmitter electrodes, and the second plurality of sensor electrodes 215 as a plurality of receiver electrodes. In another embodiment, processing system 110 operates the first plurality of sensor electrodes 205 and the second plurality of sensor electrodes 215 as absolute capacitive sensing electrodes.

The first plurality of sensor electrodes 205 and the second plurality of sensor electrodes 215 are typically ohmically isolated from each other. That is, one or more insulators separate the first plurality of sensor electrodes 205 and the second plurality of sensor electrodes 215 and prevent them from electrically shorting to each other. In some embodiments, the first plurality of sensor electrodes 205 and the second plurality of sensor electrodes 215 may be disposed on a common layer. The pluralities of sensor electrodes 205, 215 may be electrically separated by insulative material disposed between them at cross-over areas; in such constructions, the first plurality of sensor electrodes 205 and/or the second plurality of sensor electrodes 215 may be formed with jumpers connecting different portions of the same electrode. In some embodiments, the first plurality of sensor electrodes 205 and the second plurality of sensor electrodes 215 are separated by one or more layers of insulative material. In some embodiments, the first plurality of sensor electrodes 205 and the second plurality of sensor electrodes 215 are separated by one or more substrates; for example, they may be disposed on opposite sides of the same substrate, or on different substrates that are laminated together.

The pluralities of sensor electrodes 205, 215 may be formed into any desired shapes. Moreover, the size and/or shape of the sensor electrodes 205 may be different than the size and/or shape of the sensor electrodes 215. Additionally, sensor electrodes 205, 215 located on a same side of a substrate may have different shapes and/or sizes. In one embodiment, the first plurality of sensor electrodes 205 may be larger (e.g., having a larger surface area) than the second plurality of sensor electrodes 215, although this is not a requirement. In other embodiments, the first and second pluralities of sensor electrodes 205, 215 may have a similar size and/or shape.

In one embodiment, the first plurality of sensor electrodes 205 extends substantially in a first direction while the second plurality of sensor electrodes 215 extends substantially in a second direction. For example, and as shown in FIG. 2, the first plurality of sensor electrodes 205 extend in one direction, while the second plurality of sensor electrodes 215 extend in a direction substantially orthogonal to the sensor electrodes 205. Other orientations are also possible (e.g., parallel or other relative orientations).

In some embodiments, both the first and second pluralities of sensor electrodes 205, 215 are located outside of a plurality (or display stack) of layers that together form the display device 160. One example of a display stack may include layers such as a lens layer, a one or more polarizer layers, a color filter layer, one or more display electrodes layers, a display material layer, a thin-film transistor (TFT) glass layer, and a backlight layer. However, other implementations of a display stack are possible. In other embodiments, one or both of the first and second pluralities of sensor electrodes 205, 215 are located within the display stack, whether included as part of a display-related layer or a separate layer. For example, Vcom electrodes within a particular display electrode layer can be configured to perform both display updating and capacitive sensing.

Arrangement 300 of FIG. 3 illustrates a portion of a pattern of sensor electrodes configured to sense in sensing region 170, according to several embodiments. For clarity of illustration and description, FIG. 3 shows the sensor electrodes 120 in a pattern of simple rectangles and does not show other associated components. The exemplary pattern comprises an array of sensor electrodes $120_{X,Y}$ arranged in X columns and Y rows, wherein X and Y are positive integers, although one of X and Y may be zero. It is contemplated that the pattern of sensor electrodes 120 may have other configurations, such as polar arrays, repeating patterns, non-repeating patterns, a single row or column, or other suitable implementation. Further, in various embodiments the number of sensor electrodes 120 may vary from row to row and/or column to column. In one embodiment, at least one row and/or column of sensor electrodes 120 is offset from the others, such it extends further in at least one direction than the others. The sensor electrodes 120 is coupled to the processing system 110 and utilized to determine the presence (or lack thereof) of an input object in the sensing region 170.

In a first mode of operation, the arrangement of sensor electrodes 120 ($120_{1,1}$, $120_{2,1}$, $120_{3,1}$, $120_{X,Y}$) may be utilized to detect the presence of an input object via absolute sensing techniques. That is, processing system 110 is configured to modulate sensor electrodes 120 to acquire measurements of changes in capacitive coupling between the modulated sensor electrodes 120 and an input object to determine the position of the input object. Processing system 110 is further configured to determine changes of absolute capacitance based on a measurement of resulting signals received with sensor electrodes 120 which are modulated.

In some embodiments, the arrangement 300 includes one or more grid electrodes (not shown) that are disposed between at least two of the sensor electrodes 120. The grid electrode(s) may at least partially circumscribe the plurality of sensor electrodes 120 as a group, and may also, or in the alternative, completely or partially circumscribe one or more of the sensor electrodes 120. In one embodiment, the grid electrode is a planar body having a plurality of apertures, where each aperture circumscribes a respective one of the sensor electrodes 120. In other embodiments, the grid electrode(s) comprise a plurality of segments that may be driven individually or in groups or two or more segments. The grid electrode(s) may be fabricated similar to the sensor electrodes 120. The grid electrode(s), along with sensor electrodes 120, may be coupled to the processing system 110 utilizing conductive routing traces and used for input object detection.

The sensor electrodes 120 are typically ohmically isolated from each other, and are also ohmically isolated from the grid electrode(s). That is, one or more insulators separate the sensor electrodes 120 and grid electrode(s) and prevent them from electrically shorting to each other. In some embodiments, the sensor electrodes 120 and grid electrode(s) are separated by an insulative gap, which may be filled with an electrically insulating material, or may be an air gap. In some embodiments, the sensor electrodes 120 and the grid electrode(s) are vertically separated by one or more layers of insulative material. In some other embodiments, the sensor electrodes 120 and the grid electrode(s) are separated by one or more substrates; for example, they may be disposed on opposite sides of the same substrate, or on different substrates. In yet other embodiments, the grid electrode(s) may be composed of multiple layers on the same substrate, or on different substrates. In one embodiment, a first grid electrode may be formed on a first substrate (or a first side of a substrate) and a second grid electrode may be formed on a second substrate (or a second side of a substrate). For example, a first grid electrode comprises one or more common electrodes disposed on a thin-film transistor (TFT) layer of the display device 160 (FIG. 1) and a second grid electrode is disposed on the color filter glass of the display device 160. The dimensions of the first and second grid electrodes can be equal or differ in at least one dimension.

In a second mode of operation, the sensor electrodes 120 ($120_{1,1}$, $120_{2,1}$, $120_{3,1}$, ..., $120_{X,Y}$) may be utilized to detect the presence of an input object via transcapacitive sensing techniques when a transmitter signal is driven onto the grid electrode(s). That is, processing system 110 is configured to drive the grid electrode(s) with a transmitter signal and to receive resulting signals with each sensor electrode 120, where a resulting signal comprising effects corresponding to the transmitter signal, which is utilized by the processing system 110 or other processor to determine the position of the input object.

In a third mode of operation, the sensor electrodes 120 may be split into groups of transmitter and receiver electrodes utilized to detect the presence of an input object via transcapacitive sensing techniques. That is, processing system 110 may drive a first group of sensor electrodes 120 with a transmitter signal and receive resulting signals with the second group of sensor electrodes 120, where a resulting signal comprising effects corresponding to the transmitter signal. The resulting signal is utilized by the processing system 110 or other processor to determine the position of the input object.

The input device 100 may be configured to operate in any one of the modes described above. The input device 100 may also be configured to switch between any two or more of the modes described above.

The areas of localized capacitive sensing of capacitive couplings may be termed "capacitive pixels," "touch pixels," "tixels," etc. Capacitive pixels may be formed between an individual sensor electrode 120 and a reference voltage in the first mode of operation, between the sensor electrodes 120 and grid electrode(s) in the second mode of operation, and between groups of sensor electrodes 120 used as transmitter and receiver electrodes (e.g., arrangement 200 of FIG. 2). The capacitive coupling changes with the proximity and motion of input objects in the sensing region 170 associated with the sensor electrodes 120, and thus may be used as an indicator of the presence of the input object in the sensing region of the input device 100.

In some embodiments, the sensor electrodes 120 are "scanned" to determine these capacitive couplings. That is, in one embodiment, one or more of the sensor electrodes 120 are driven to transmit transmitter signals. Transmitters may be operated such that one transmitter electrode transmits at one time, or such that multiple transmitter electrodes transmit at the same time. Where multiple transmitter electrodes transmit simultaneously, the multiple transmitter electrodes may transmit the same transmitter signal and thereby produce an effectively larger transmitter electrode. Alternatively, the multiple transmitter electrodes may transmit different transmitter signals. For example, multiple transmitter electrodes may transmit different transmitter signals according to one or more coding schemes that enable their combined effects on the resulting signals of receiver electrodes to be independently determined. In one embodiment, multiple transmitter electrodes may simultaneously transmit the same transmitter signal while the receiver electrodes receive the effects and are measured according to a scanning scheme.

The sensor electrodes 120 configured as receiver sensor electrodes may be operated singly or multiply to acquire resulting signals. The resulting signals may be used to determine measurements of the capacitive couplings at the capacitive pixels. Processing system 110 may be configured to receive with the sensor electrodes 120 in a scanning fashion and/or a multiplexed fashion to reduce the number of simultaneous measurements to be made, as well as the size of the supporting electrical structures. In one embodiment, one or more sensor electrodes are coupled to a receiver of processing system 110 via a switching element such as a multiplexer or the like. In such an embodiment, the switching element may be internal to processing system 110 or external to processing system 110. In one or more embodiments, the switching elements may be further configured to couple a sensor electrode 120 with a transmitter or other signal and/or voltage potential. In one embodiment, the switching element may be configured to couple more than one receiver electrode to a common receiver at the same time.

In other embodiments, "scanning" sensor electrodes 120 to determine these capacitive couplings comprises modulating one or more of the sensor electrodes and measuring an absolute capacitance of the one or more sensor electrodes. In another embodiment, the sensor electrodes may be operated such that more than one sensor electrode is driven and received with at a time. In such embodiments, an absolute capacitive measurement may be obtained from each of the one or more sensor electrodes 120 simultaneously. In one embodiment, each of the sensor electrodes 120 are simultaneously driven and received with, obtaining an absolute capacitive measurement simultaneously from each of the sensor electrodes 120. In various embodiments, processing system 110 may be configured to selectively modulate a portion of sensor electrodes 120. For example, the sensor electrodes may be selected based on, but not limited to, an application running on the host processor, a status of the input device, and an operating mode of the sensing device. In various embodiments, processing system 110 may be configured to selectively shield at least a portion of sensor electrodes 120 and to selectively shield or transmit with the grid electrode(s) 122 while selectively receiving and/or transmitting with other sensor electrodes 120.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

In any of the above embodiments, multiple sensor electrodes 120 may be ganged together such that the sensor electrodes 120 are simultaneously modulated or simultaneously received with. As compared to the methods described above, ganging together multiple sensor electrodes may produce a coarse capacitive image that may not be usable to discern precise positional information. However, a coarse capacitive image may be used to sense presence of an input object. In one embodiment, the coarse capacitive image may be used to move processing system 110 or the input device 100 out of a "doze" mode or low-power mode. In one embodiment, the coarse capacitive image may be used to move a capacitive sensing IC out of a "doze" mode or low-power mode. In another embodiment, the coarse capacitive image may be used to move at least one of a host IC and a display driver out of a "doze" mode or low-power mode. The coarse capacitive image may correspond to the entire sensor area or only to a portion of the sensor area.

The background capacitance of the input device 100 is the capacitive image associated with no input object in the sensing region 170. The background capacitance changes with the environment and operating conditions, and may be estimated in various ways. For example, some embodiments take "baseline images" when no input object is determined to be in the sensing region 170, and use those baseline images as estimates of their background capacitances. The background capacitance or the baseline capacitance may be present due to stray capacitive coupling between two sensor electrodes, where one sensor electrode is driven with a modulated signal and the other is held stationary relative to system ground, or due to stray capacitive coupling between a receiver electrode and nearby modulated electrodes. In many embodiments, the background or baseline capacitance may be relatively stationary over the time period of a user input gesture.

Capacitive images can be adjusted for the background capacitance of the input device 100 for more efficient processing. Some embodiments accomplish this by "baselining" measurements of the capacitive couplings at the capacitive pixels to produce a "baselined capacitive image." That is, some embodiments compare the measurements forming a capacitance image with appropriate "baseline values" of a "baseline image" associated with those pixels, and determine changes from that baseline image.

In some touch screen embodiments, one or more of the sensor electrodes 120 comprise one or more display electrodes used in updating the display of the display screen. The display electrodes may comprise one or more elements of the active matrix display such as one or more segments of a segmented Vcom electrode (common electrode(s)), a source drive line, gate line, an anode sub-pixel electrode or cathode pixel electrode, or any other suitable display element. These display electrodes may be disposed on an appropriate display screen substrate. For example, the common electrodes may be disposed on a transparent substrate (a glass substrate, TFT glass, or any other transparent material) in some display screens (e.g., In-Plane Switching (IPS), Fringe Field Switching (FFS) or Plane to Line Switching (PLS) Organic Light Emitting Diode (OLED)), on the bottom of the color filter glass of some display screens (e.g., Patterned Vertical Alignment (PVA) or Multi-domain Vertical Alignment (MVA)), over an emissive layer (OLED), etc. In such embodiments, the display electrode can also be referred to as a "combination electrode," since it performs multiple functions. In various embodiments, each of the sensor electrodes 120 comprises one or more common electrodes. In other embodiments, at least two sensor electrodes 120 may share at least one common electrode. While the following description may describe that sensor electrodes 120 and/or grid electrode(s) comprise one or more common electrodes, various other display electrodes as describe above may also be used in conjunction with the common electrode or as an alternative to the common electrodes. In various embodiments, the sensor electrodes 120 and grid electrode(s) comprise the entire common electrode layer (Vcom electrode).

In various touch screen embodiments, the "capacitive frame rate" (the rate at which successive capacitive images are acquired) may be the same or be different from that of the "display frame rate" (the rate at which the display image is updated, including refreshing the screen to redisplay the same image). In various embodiments, the capacitive frame rate is an integer multiple of the display frame rate. In other embodiments, the capacitive frame rate is a fractional multiple of the display frame rate. In yet further embodiments, the capacitive frame rate may be any fraction or integer multiple of the display frame rate. In one or more embodiments, the display frame rate may change (e.g., to reduce power or to provide additional image data such as a 3D display information) while touch frame rate maintains constant. In other embodiment, the display frame rate may remain constant while the touch frame rate is increased or decreased.

Continuing to refer to FIG. 3, the processing system 110 coupled to the sensor electrodes 120 includes a sensor module 310 and optionally, a display module 320. The sensor module 310 includes circuitry configured to drive at least one of the sensor electrodes 120 for capacitive sensing during periods in which input sensing is desired. In one embodiment, the sensor module 310 is configured to drive a modulated signal onto the at least one sensor electrode 120 to detect changes in absolute capacitance between the at least one sensor electrode and an input object. In another embodiment, the sensor module 310 is configured to drive a transmitter signal onto the at least one sensor electrode 120 to detect changes in a transcapacitance between the at least one sensor electrode and another sensor electrode 120. The modulated and transmitter signals are generally varying voltage signals comprising a plurality of voltage transitions over a period of time allocated for input sensing. In various embodiments, the sensor electrodes 120 and/or grid electrode(s) may be driven differently in different modes of operation. In one embodiment, the sensor electrodes 120 and/or grid electrode(s) may be driven with signals (modulated signals, transmitter signals and/or shield signals) that may differ in any one of phase, amplitude, and/or shape. In various embodiments, the modulated signal and transmitter signal are similar in at least one shape, frequency, amplitude, and/or phase. In other embodiments, the modulated signal and the transmitter signals are different in frequency, shape, phase, amplitude, and phase. The sensor module 310 may be selectively coupled one or more of the sensor electrodes 120 and/or the grid electrode(s). For example, the sensor module 310 may be coupled to selected portions of the sensor electrodes 120 and operate in either an absolute or transcapacitive sensing mode. In another example, the sensor module 310 may be a different portion of the sensor electrodes 120 and operate in either an absolute or transcapacitive sensing mode. In yet another example, the sensor module 310 may be coupled to all the sensor electrodes 120 and operate in either an absolute or transcapacitive sensing mode.

The sensor module 310 is configured to operate the grid electrode(s) as a shield electrode that may shield sensor electrodes 120 from the electrical effects of nearby conductors. In one embodiment, the processing system is configured to operate the grid electrode(s) as a shield electrode that may "shield" sensor electrodes 120 from the electrical effects of nearby conductors, and to guard the sensor electrodes 120 from grid electrode(s), at least partially reducing the parasitic capacitance between the grid electrode(s) and the sensor electrodes 120. In one embodiment, a shielding signal is driven onto the grid electrode(s). The shielding signal may be a ground signal, such as the system ground or other ground, or any other constant voltage (i.e., non-modulated) signal. In another embodiment, operating the grid electrode(s) as a shield electrode may comprise electrically floating the grid electrode. In one embodiment, grid electrode(s) are able to operate as an effective shield electrode while being electrode floated due to its large coupling to the other sensor electrodes. In other embodiment, the shielding signal may be referred to as a "guarding signal" where the guarding signal is a varying voltage signal having at least one of a similar phase, frequency, and amplitude as the modulated signal driven on to the sensor electrodes. In one or more embodiment, routing traces may be shielded from responding to an input object due to routing beneath the grid electrode(s) and/or sensor electrodes 120, and therefore may not be part of the active sensor electrodes, shown as sensor electrodes 120.

In one or more embodiments, capacitive sensing (or input sensing) and display updating may occur during at least partially overlapping periods. For example, as a common electrode is driven for display updating, the common electrode may also be driven for capacitive sensing. In another embodiment, capacitive sensing and display updating may occur during non-overlapping periods, also referred to as non-display update periods. In various embodiments, the non-display update periods may occur between display line update periods for two display lines of a display frame and may be at least as long in time as the display update period. In such embodiments, the non-display update period may be referred to as a "long horizontal blanking period," "long h-blanking period" or a "distributed blanking period," where the blanking period occurs between two display updating periods and is at least as long as a display update period. In one embodiment, the non-display update period occurs between display line update periods of a frame and is long enough to allow for multiple transitions of the transmitter signal to be driven onto the sensor electrodes 120. In other embodiments, the non-display update period may comprise horizontal blanking periods and vertical blanking periods. Processing system 110 may be configured to drive sensor electrodes 120 for capacitive sensing during any one or more of or any combination of the different non-display update times. Synchronization signals may be shared between sensor module 310 and display module 320 to provide accurate control of overlapping display updating and capacitive sensing periods with repeatably coherent frequencies and phases. In one embodiment, these synchronization signals may be configured to allow the relatively stable voltages at the beginning and end of the input sensing period to coincide with display update periods with relatively stable voltages (e.g., near the end of a input integrator reset time and near the end of a display charge share time). A modulation frequency of a modulated or transmitter signal may be at a harmonic of the display line update rate, where the phase is determined to provide a nearly constant charge coupling from the display elements to the receiver electrode, allowing this coupling to be part of the baseline image.

The sensor module 310 includes circuitry configured to receive resulting signals with the sensor electrodes 120 and/or grid electrode(s) comprising effects corresponding to the modulated signals or the transmitter signals during periods in which input sensing is desired. The sensor module 310 may determine a position of the input object in the sensing region 170 or may provide a signal including information indicative of the resulting signal to another module or processor, for example, a determination module or a processor of an associated electronic device 150 (i.e., a host processor), for determining the position of the input object in the sensing region 170.

The display module 320 may be included in or separate from the processing system 110. The display module 320 includes circuitry configured to provide display image update information to the display of the display device 160 during non-sensing (e.g., display updating) periods.

In one embodiment, the processing system 110 comprises a first integrated controller comprising the display module 320 and at least a portion of the sensor module 310 (i.e., transmitter module and/or receiver module). In another embodiment, the processing system 110 comprises a first integrated controller comprising the display module 320 and a second integrated controller comprising the sensor module 310. In yet another embodiment, the processing system comprises a first integrated controller comprising display module 320 and a first portion of the sensor module 310 (e.g., one of a transmitter module and a receiver module) and a second integrated controller comprising a second portion of the sensor module 310 (e.g., the other one of the transmitter and receiver modules). In those embodiments comprising multiple integrated circuits, a synchronization mechanism may be coupled between them, configured to synchronize display updating periods, sensing periods, transmitter signals, display update signals, and the like.

Figure 4:
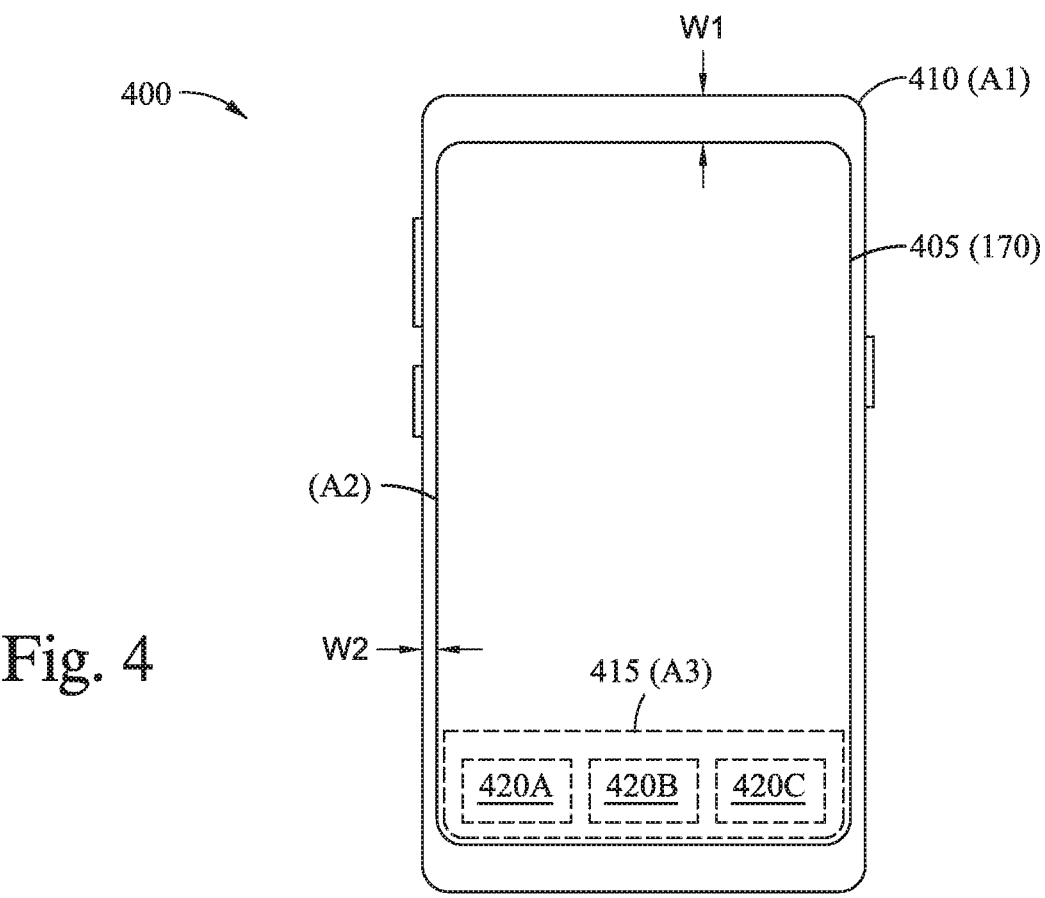
FIG. 4 illustrates virtual buttons within a display area of an exemplary input device, according to embodiments described herein.

Exemplary Arrangements for Force Sensing Using Sensor Electrodes of Different Materials FIG. 4 illustrates virtual buttons within a display area of an exemplary input device 400, according to embodiments described herein. The input device 400 may be used in conjunction with other embodiments disclosed herein, and may represent one example of the input device 100 of FIG. 1. While the input device 400 is depicted as a smart phone, other implementations of the input device 400 are also possible.

An areal extent of the input device 400 is defined by a bezel member 410, which is represented in FIG. 4 as an area A1. The bezel member 410 has a first width W1 along the top and bottom (as illustrated) of the input device 400 and a width W2 along the left and right sides of the input device 400. Width W1 is greater than width W2, although this is not a requirement. A display area 405 is substantially circumscribed by the bezel member 410 and defines an area A2 within the area A1. In some embodiments, the sensing region 170 has substantially a same areal extent as the display area 405.

To increase the proportion of the display area 405 (area A2) and the sensing region 170 within the area A1, the dimensions of the bezel member 410 (e.g., one or both of the widths W1, W2) should be reduced. However, reducing the widths W1, W2 can result in an amount of bezel area that is insufficient to include dedicated physical button(s) at the surface of the input device 400. The physical buttons can correspond to any desired functionality of the input device 400, such as a "home" button configured to return to a top-level menu screen, buttons configured to perform Web browsing and/or searching functions, and so forth. Thus, the lack of physical buttons can correspond to a loss of functionality of the input device 400.

In some embodiments, a portion 415 of the display area 405 includes sensor electrodes having different materials. Exemplary sensor electrode arrangements are described below with respect to FIGS. 5-8. Within the portion 415, first sensor electrodes of a first material have a positive gauge factor, and second sensor electrodes of a second material have a negative gauge factor. As discussed herein, "gauge factor" refers to a change in electrical resistance responsive to applied mechanical strain. For increases in applied strain, the first sensor electrodes with a positive gauge factor have increases in resistance, while the second sensor electrodes with a negative gauge factor have decreases in resistance. The first sensor electrodes and second sensor electrodes may be combined in one or more bridge circuits that are selectively formed by a processing system of the input device 400. The combination of the first sensor electrodes and the second sensor electrodes in a bridge circuit allows for temperature compensation with an improved force sensitivity. In some embodiments, the first sensor electrodes and the second sensor electrodes each have a positive temperature coefficient, such that increases in temperature correspond to increases in electrical resistance. In some embodiments, the positive gauge factor and the negative gauge factor have substantially the same magnitude (but opposing signs), and the first sensor electrodes and the second sensor electrodes have substantially the same temperature response (i.e., magnitude and sign). Within the portion 415, one or more virtual buttons 420A, 420B, 420C (generically referred to as virtual buttons 420) may be selectively displayed using the display. The sensor electrodes of the first and second materials that are included in the portion 415 may be responsive to force measurements at the virtual buttons 420A, 420B, 420C to provide a desired functionality for the input device 400.

The portion 415 corresponds to an area A3. As shown, the area A3 is less than the area A2 of the display area 405, but this is not a requirement. In one embodiment, sensor electrodes disposed within the sensing region 170 (but outside of the portion 415) are formed of a single material type, whether the material corresponds to a positive gauge factor or a negative gauge factor. In another embodiment, other portion(s) of the sensing region 170 include sensor electrodes of different materials extend.

Other implementations may include differently sized and/or differently disposed portion(s) 415. In another embodiment, the portion 415 comprises the entire display area 405, such that the virtual button(s) 420 may be displayed with any desired positioning within the display area 405. In yet another embodiment, multiple portions 415 are included within the display area 405, such that the virtual button(s) 420 may be located with different positioning within the display area 405. For example, the virtual buttons 420 may be repositioned responsive to determining a rotated orientation of the input device 400 (e.g., from a portrait to a landscape orientation).

Figure 5:
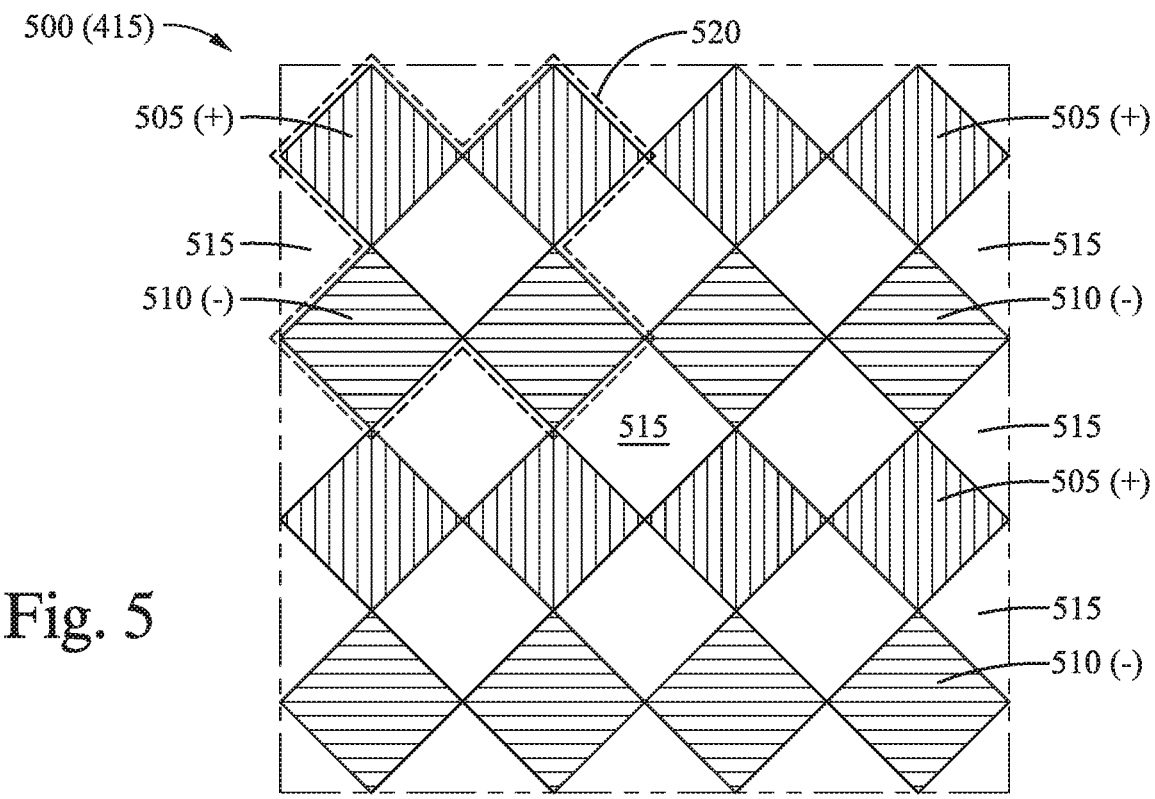
FIG. 5 illustrates an exemplary sensor electrode arrangement, according to embodiments described herein.

FIG. 5 illustrates an exemplary sensor electrode arrangement 500, according to embodiments described herein. The arrangement 500 may be used in conjunction with other embodiments disclosed herein, and may represent one example of the portion 415 of FIG. 4.

In arrangement 500, a plurality of first sensor electrodes 505 are formed of a first material having a positive gauge factor (+), and a plurality of second sensor electrodes 510 are formed of a second material having a negative gauge factor (−). The sensor electrodes having a positive gauge factor (e.g., first sensor electrodes 505) are depicted with vertical hatching, and the sensor electrodes having a negative gauge factor (e.g., second sensor electrodes 510) are depicted with horizontal hatching. In some embodiments, the first material comprises a metal mesh material having properties such that the first sensor electrodes 505 are substantially optically transmissive. For example, the metal mesh material may be copper or other suitably conductive metal that is not itself optically transmissive. The arrangement of each first sensor electrode 505 may comprise relatively thin lines of the metal mesh material (e.g., between about 1 and about 10 microns wide). In some embodiments, the thin lines of the metal mesh material may be spaced apart to form a plurality of interstitial spaces, which provide the substantially optically transmissive property to the metal mesh when viewed on a macroscopic scale. In some embodiments, the second material comprises an optically transmissive film material such as indium tin oxide (ITO). The second material may optically transmissive both at macroscopic and microscopic scales.

In some embodiments, individual sensor electrodes of the first sensor electrodes 505 and the second sensor electrodes 510 may be formed substantially as plane shapes each defining a macroscopically contiguous area. The plane shapes may be regular (i.e., having same sides and angles) or irregular. Some non-limiting examples of regular plane shapes include squares, rectangles, diamonds, hexagons, and so forth. While described as substantially two-dimensional plane shapes, alternate embodiments may include substantially three-dimensional solid shapes for the first sensor electrodes 505 and the second sensor electrodes 510. On a microscopic scale, the macroscopically contiguous area of each first sensor electrode 505 and/or each second sensor electrode 510 may be contiguous or non-contiguous. In one embodiment, the macroscopically contiguous area of each first sensor electrode 505 is also microscopically contiguous, and the macroscopically contiguous area of each second sensor electrode 510 is microscopically non-contiguous.

In other embodiments, an area defined by individual sensor electrodes of the first sensor electrodes 505 and/or the second sensor electrodes 510 may be macroscopically non-contiguous. For example, the first sensor electrodes 505 and/or the second sensor electrodes 510 may be formed as substantially serpentine shapes, such that a desired length and/or width of the sensor electrode may be selected within a particular area of the sensor electrode. As the resistance of a conductor is generally proportional to its length and inversely proportional to its width, the length and/or width of the first sensor electrodes 505 and/or the second sensor electrodes 510 may be controlled to have desired resistance values. In one example, an ITO sensor electrode may have a resistance about 5 times greater than a metal mesh sensor electrode of the same electrode pattern. Assuming that ITO sensor electrodes and metal mesh sensor electrodes should have a same resistance value, the metal mesh sensor electrode may be formed as a substantially serpentine shape to thereby increase the resistance of the metal mesh sensor electrode.

Arrangement 500 further comprises a plurality of third sensor electrodes 515 that are formed of a single material type, whether the material corresponds to a positive gauge factor or a negative gauge factor. In some embodiments, the first sensor electrodes 505, the second sensor electrodes 510, and the third sensor electrodes 515 are formed within a single layer. Although not explicitly illustrated, the first sensor electrodes 505, the second sensor electrodes 510, and the third sensor electrodes 515 may be ohmically isolated from each other using an air gap or insulative materials. Further, the first sensor electrodes 505, the second sensor electrodes 510, and the third sensor electrodes 515 may correspond to display electrodes (e.g., VCOM electrodes).

As shown, the first sensor electrodes 505, the second sensor electrodes 510, and the third sensor electrodes 515 are diamond-shaped and are arranged in a checkerboard pattern. Other implementations may have different shapes and/or sizes of the first sensor electrodes 505, the second sensor electrodes 510, and the third sensor electrodes 515. In some alternate embodiments, the arrangement 500 does not include the plurality of third sensor electrodes 515.

Arrangement 500 includes a repeating sequence of a first row of first sensor electrodes 505, a second row of third sensor electrodes 515, a third row of second sensor electrodes 510, and a fourth row of third sensor electrodes 515. In some embodiments, during transcapacitive sensing the third sensor electrodes 515 are operated as transmitter electrodes, and the first sensor electrodes 505 and the second sensor electrodes 510 are operated as receiver electrodes for acquiring capacitive measurements. In some embodiments, the first sensor electrodes 505, the second sensor electrodes 510, and/or the third sensor electrodes 515 may also be used for absolute capacitive sensing.

During force sensing, the first sensor electrodes 505 and the second sensor electrodes 510 are grouped together in one or more groups 520. Each group 520 may be selected by the processing system to selectively form one or more bridge circuits for acquiring force measurements. In some embodiments, the third sensor electrodes 515 are not used for acquiring force measurements. The one or more groups 520 may be predefined and/or dynamically determined by the processing system. Using the one or more groups 520, the processing system may operate one or more switching elements to couple and decouple the first sensor electrodes 505 and the second sensor electrodes 510 to form the one or more bridge circuits. As discussed above, the one or more bridge circuits may be formed to overlap with a virtual button selectively displayed in the display area.

As shown, the group 520 includes two first sensor electrodes 505 within a first row and two second sensor electrodes 510 within a second row. In some embodiments, the group 520 may include different numbers of the first sensor electrodes 505 and/or the second sensor electrodes 510. Additionally, in some embodiments the first sensor electrodes 505 and the second sensor electrodes 510 of the group 520 are defined within a same row. In one non-limiting example, two or more first sensor electrodes 505 or two or more second sensor electrodes 510 are arranged within a single leg of the bridge circuit. Further, although the first sensor electrodes 505 and second sensor electrodes 510 are adjacent with each other in the group 520, this is not a requirement. For example, the first sensor electrodes 505 and second sensor electrodes 510 may be selected to correspond to a desired coverage area for the group 520. Generally, a smaller coverage area (such as the adjacent first sensor electrodes 505 and second sensor electrodes 510) or a larger coverage area can correspond to a higher resolution (e.g., a higher signal-to-noise ratio) for force sensing.

The discussion above focuses on implementations in which the first sensor electrodes 505 and the second sensor electrodes 510 may be selectively connected to form bridge circuits for acquiring force measurements. However, in other implementations, the processing system may be configured to determine individual electrical properties of the first sensor electrodes 505 and the second sensor electrodes 510 as part of acquiring force measurements. For example, the processing system may select one or more first sensor electrodes 505 and one or more second sensor electrodes 510 to form the group 520, and may determine resistances of the one or more first sensor electrodes 505 and the one or more second sensor electrodes 510 to acquire force measurements.

Figure 6:
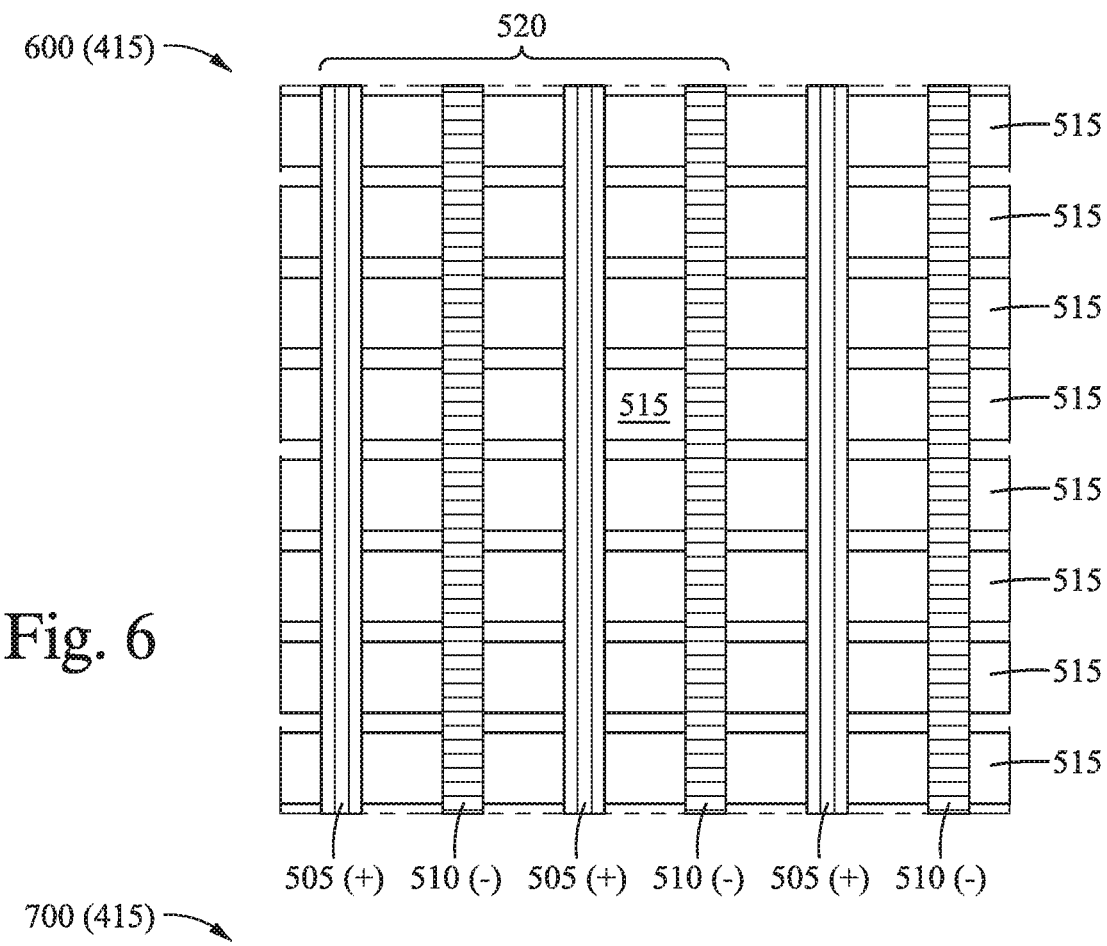
FIG. 6 illustrates an exemplary overlapping sensor electrode arrangement, according to embodiments described herein.

FIG. 6 illustrates an exemplary overlapping sensor electrode arrangement 600, according to embodiments described herein. The arrangement 600 may be used in conjunction with other embodiments disclosed herein, and may represent one example of the portion 415 of FIG. 4.

In the arrangement 600, an alternating pattern of first sensor electrodes 505 and second sensor electrodes 510 overlap a plurality of third sensor electrodes 515. The first sensor electrodes 505 and the second sensor electrodes 510 extend along a first direction, and the third sensor electrodes 515 extend along a second direction that is different than the first direction. As shown, the second direction is substantially orthogonal to the first direction, but other relative orientations are also possible. The group 520 is formed using two first sensor electrodes 505 and two second sensor electrodes 510.

Although the arrangement 600 is shown as having an alternating pattern of first sensor electrodes 505 and second sensor electrodes 510 with a substantially equal spacing, alternate embodiments may have different ordering and/or spacing of the first sensor electrodes 505 and the second sensor electrodes 510. For example, the arrangement may comprise pairs of sensor electrodes, where each pair includes a first sensor electrode 505 and a second sensor electrode 510. The pitch (or spacing) between the first sensor electrode 505 and the second sensor electrode 510 within the pair may be less than the pitch between adjacent pairs.

In some embodiments, the processing system comprises a plurality of switching elements that are configured to couple the first sensor electrode 505 and the second sensor electrode 510 within the respective pairs of sensor electrodes to form a plurality of composite electrodes. For example, a first switching element may couple the first sensor electrode 505 and the second sensor electrode 510 in series to form a composite electrode. The composite electrodes may be used to acquire capacitive measurements. In some cases, the processing system couples the first sensor electrode 505 and the second sensor electrode 510 with a first arrangement for acquiring capacitive measurements, and with a different second arrangement for acquiring force measurements.

A bridge circuit formed using the first sensor electrodes 505 and the second sensor electrodes 510 may have a greatest sensitivity to changes in force when the bridge circuit is "balanced." The bridge circuit is considered balanced when each of the legs of the bridge circuit have substantially a same resistance. In some cases, each of the first sensor electrodes 505 and the second sensor electrodes 510 have substantially a same resistance corresponding to a given force level (e.g., no force applied), but this is not a requirement. However, the first material and the second material that are respectively used in the first sensor electrodes 505 and the second sensor electrodes 510 may have different resistivity values. Therefore, in some embodiments, resistance matching techniques may be used to provide a same resistance for each leg of the bridge circuit.

In some embodiments, one or more trim resistances are included in one or more of the legs of the bridge circuit. In some embodiments, the dimensions of the first sensor electrodes 505 and the second sensor electrodes 510 are selected to provide a desired resistance of the legs. In some embodiments, the numbers of the first sensor electrodes 505 and the second sensor electrodes 510 are selected to provide a desired resistance of the legs. Although described separately, a combination of multiple features for resistance matching of the legs is also contemplated.

Figure 7:
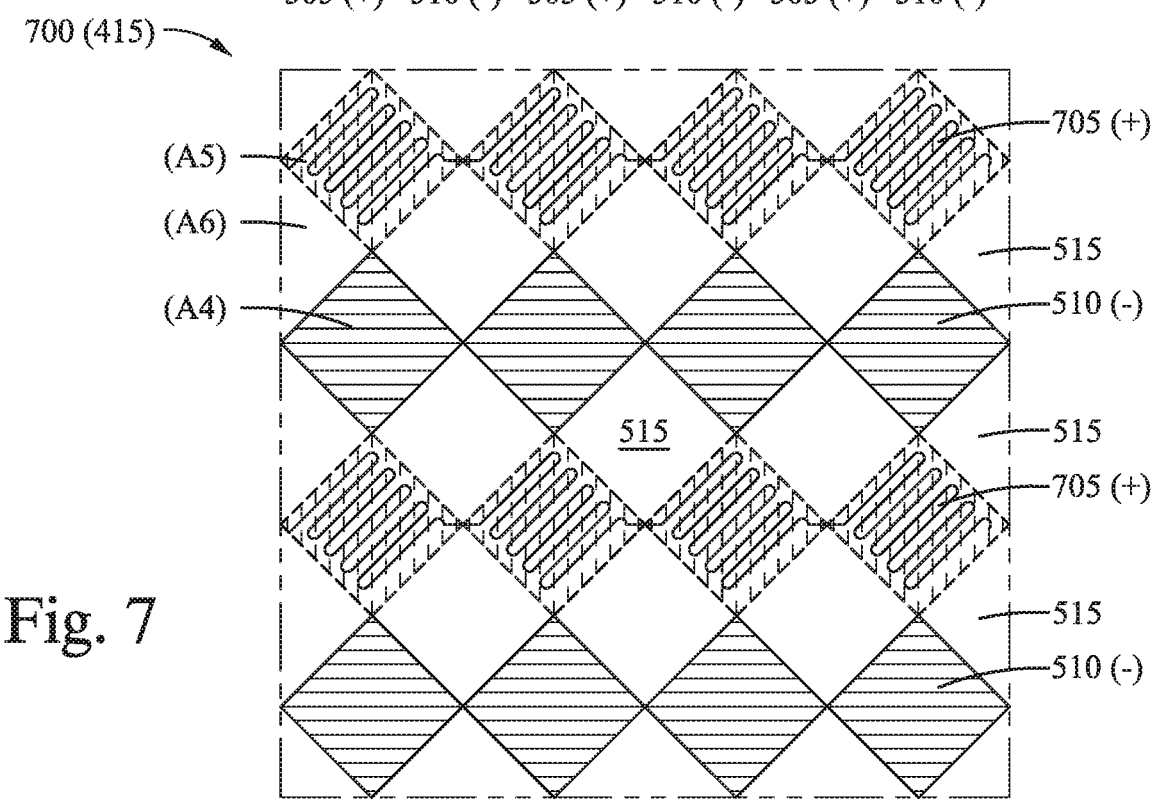
FIG. 7 illustrates an exemplary sensor electrode arrangement including serpentine shape electrodes, according to embodiments described herein.

FIG. 7 illustrates an exemplary sensor electrode arrangement 700 including serpentine shape electrodes, according to embodiments described herein. The arrangement 700 may be used in conjunction with other embodiments disclosed herein, and may represent one example of the portion 415 of FIG. 4.

The arrangement 700 includes first sensor electrodes 705 of a first material having a positive gauge factor (+). The first sensor electrodes 705 are serpentine shape electrodes each defining a macroscopically non-contiguous area A5, and the second sensor electrodes 510 are plane shape electrodes each defining a macroscopically contiguous area A4. In one example implementation, the first sensor electrodes 705 comprise a metal mesh material and the second sensor electrodes 510 comprise an ITO material. As the metal mesh material has a lower resistivity than ITO, the serpentine shape of the first sensor electrodes 705 may increase the overall resistance of the first sensor electrodes 705 when compared with a plane shape electrode of the same first material. In this way, the first sensor electrodes 705 may have a comparable (or same) resistance to the second sensor electrodes 510 to provide balanced legs of the bridge circuit.

In some embodiments, the areas A4, A5, and A6 are substantially the same, although other embodiments may include one or more different areas. Generally, comparable capacitive sensing performance can be achieved for different sensor electrodes having a same area, whether macroscopically contiguous (e.g., plane-shaped sensor electrodes) or non-contiguous (e.g., serpentine-shaped sensor electrodes). Further, in some embodiments the arrangement 700 does not include the plurality of third sensor electrodes 515.

Figure 8:
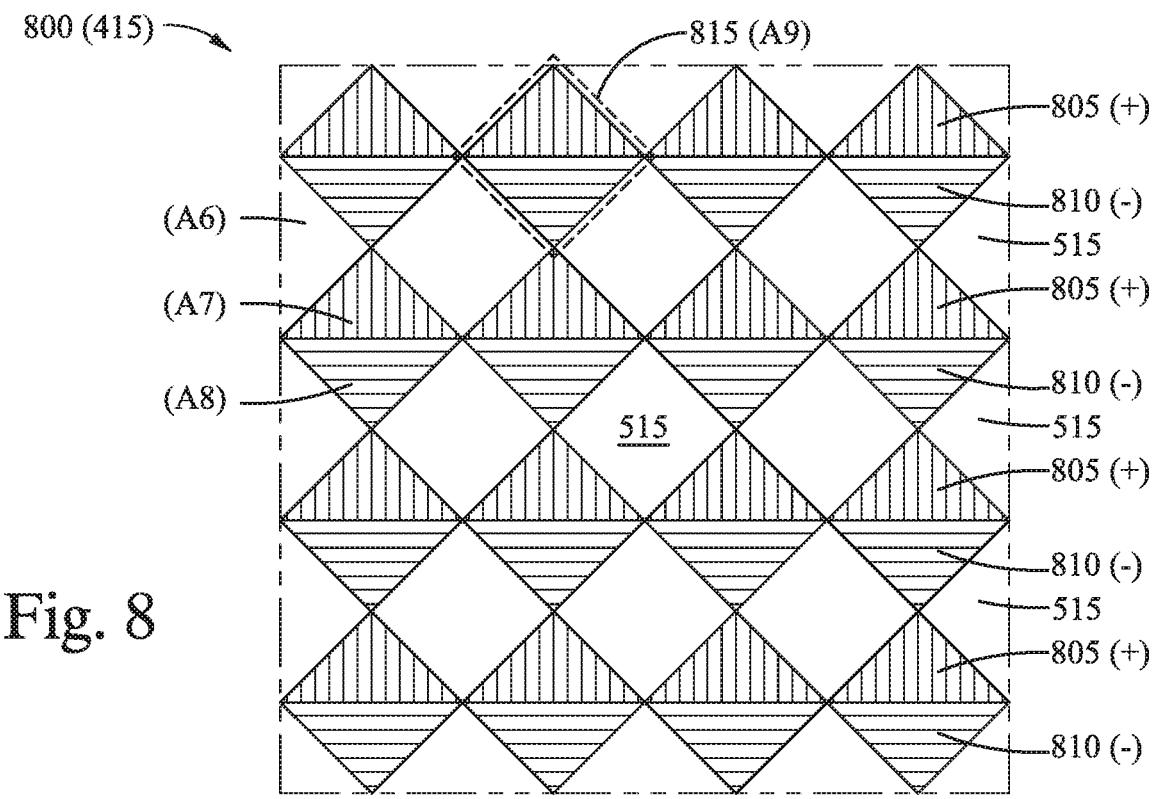
FIG. 8 illustrates an exemplary sensor electrode arrangement including composite electrodes, according to embodiments described herein.

FIG. 8 illustrates an exemplary sensor electrode arrangement 800 including composite electrodes, according to embodiments described herein. The arrangement 800 may be used in conjunction with other embodiments disclosed herein, and may represent one example of the portion 415 of FIG. 4.

The arrangement 800 includes first sensor electrodes 805 of a first material having a positive gauge factor (+), second sensor electrodes 810 of a second material having a negative gauge factor (−), and third sensor electrodes 815. In some embodiments, the processing system comprises a plurality of switching elements configured to selectively couple individual first sensor electrodes 805 with individual second sensor electrodes 810 to form a plurality of composite electrodes. For example, a first sensor electrode 805 and a second sensor electrode 810 may be connected in series using a switching element to form a composite electrode 815.

The composite electrodes 815 may be used to acquire capacitive measurements. For example, the processing system may operate the composite electrodes 815 as receiver electrodes during transcapacitive sensing, and/or may operate the composite electrodes 815 for absolute capacitive sensing.

In some embodiments, the processing system couples the first sensor electrodes 805 and the second sensor electrodes 810 with a first arrangement for acquiring capacitive measurements, and with a different second arrangement for acquiring force measurements. For example, the processing system couples first sensor electrodes 805 and second sensor electrodes 810 to form composite electrodes 815 to perform capacitive sensing, and couples first sensor electrodes 805 and second sensor electrodes 810 according to one or more groups for acquiring force measurements.

In the arrangement 800, the first sensor electrodes 705 each correspond to area A7, the second sensor electrodes 510 each correspond to area A8, and the third sensor electrodes 515 each correspond to area A6. The composite electrodes 815 each correspond to area A9, which in some cases may be substantially the same as a sum of area A7 and area A8. In some embodiments, the area A7 is substantially the same as area A8, but this is not a requirement. Consistent with the discussion provided above, areas A7, A8 may be different to provide desired resistances of the first sensor electrodes 805 and second sensor electrodes 810. Further, the first sensor electrodes 805 and/or second sensor electrodes 810 may have plane shapes or serpentine shapes to provide the desired resistances. In some embodiments, the area A9 is substantially the same as area A6, but this is not a requirement.

Beneficially, the effects of localized thermal "hot spots" (e.g., a localized increase in temperature due to finger presses, generated heat from the input device, and so forth) may be mitigated by splitting the diamond sensor electrode shape into two smaller triangle shapes as with the first sensor electrode 805 and the second sensor electrode 810. When the finger and the sensor electrodes of the touch sensor are at about the same temperature, thermal "hot spots" due to finger heat generally will not occur. However, when a significant temperature difference exists between the finger and the sensor electrodes, finger heat may cause a localized temperature change on certain sensor electrode(s). For example, assume a fingertip has a 5 millimeter (mm) diameter oval contact area and that the sensor electrode shape is a diamond pattern having 5 mm sides. If the finger is placed directly over a single sensor electrode, the heat from the finger will be seen there first, before a neighboring sensor electrode. Since the sensor electrodes may be arranged on opposite sides of the bridge circuit, a transient "false force" signal may occur with the significant temperature difference. Such a "false force" signal may persist for several seconds.

By reducing the overall footprint of the bridge circuit (here, by about 50%), the risk of thermal hot spots is also reduced. When the size of the sensor electrode is reduced, the chance of localized thermal gradients occurring will be greatly reduced since the fingertip is much larger. For example, the diamond-shaped sensor electrode could be reduced to have 1 mm sides. As shown in arrangement 800, the diamond-shaped sensor electrode is halved in size (e.g., into two triangles) to significantly reduce the risk of thermal false triggers.

Further, comparable capacitive sensing performance to the arrangements 500, 700 (FIGS. 5, 7) can be achieved with the arrangement 800, as the processing system is configured to operate switching elements to dynamically connect the triangle shapes into the larger diamond-shaped sensor electrodes (having a comparable area to the sensor electrodes of arrangements 500, 700) when acquiring capacitive measurements. With the triangle-shaped sensor electrodes, analog switches may be used to selectively combine pairs of triangles into an effectively larger diamond-shaped electrode. In a capacitive sensing mode, the switch is closed and the equivalent circuit corresponds to a diamond shape. In this case, touch performance should be substantially identical to a single diamond-shaped sensor electrode. In an alternative embodiment, analog switches are not used for selectively combining the different triangle-shaped sensor electrodes. Instead, the processing system acquires capacitive measurements with each row of triangle-shaped sensor electrodes, which may provide an improved capacitive sensing performance compared to the diamond-shaped sensor electrodes. Such a case would typically require additional receiver circuitry (e.g., twice as many receivers) in the processing system.

Figure 9:
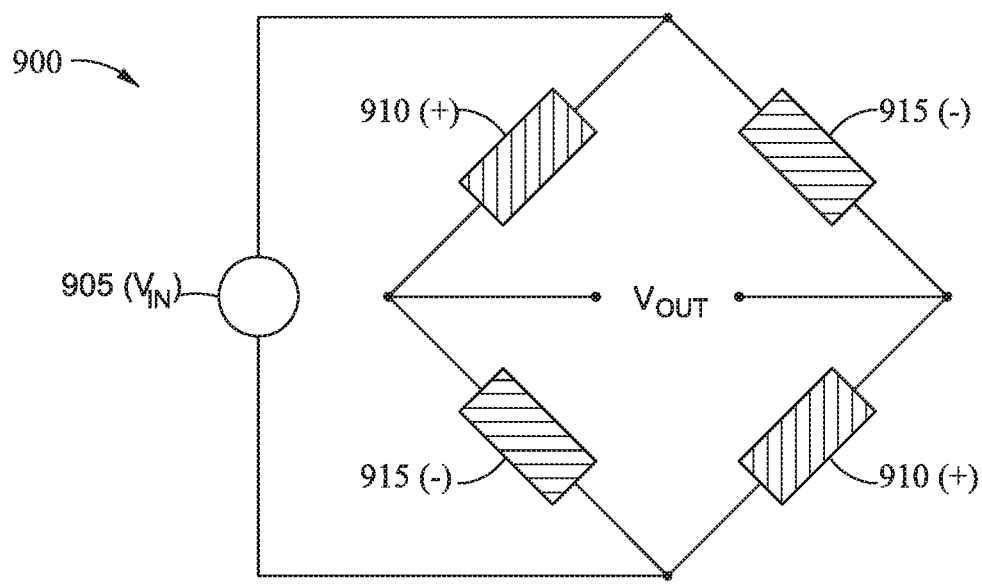
FIG. 9 is a circuit diagram illustrating an exemplary bridge circuit using sensor electrodes of different materials, according to embodiments described herein.

FIG. 9 is a circuit diagram illustrating an exemplary bridge circuit 900 using sensor electrodes of different materials, according to embodiments described herein. The bridge circuit 900 may be used in conjunction with other embodiments disclosed herein, such as any of the sensor electrode arrangements 500, 600, 700, 800. While the bridge circuit 900 is depicted substantially as a Wheatstone bridge, other bridge circuit implementations are also contemplated.

In bridge circuit 900, a voltage source 905 provides an input voltage signal Vin across a first leg comprising a first resistance 910 and a second resistance 915, and across a second leg comprising a third resistance 915 and a fourth resistance 910. The resistances 910 generally represent sensor electrodes having a positive gauge factor (+), and the resistances 915 generally represent sensor electrodes having a negative gauge factor (−). An output voltage signal Vout is generally measured between the first leg and the second leg, specifically between nodes between the resistances of each leg.

Each of the resistances 910, 915 may represent one or more sensor electrodes of a material type having the corresponding gauge factor. Further, although not explicitly depicted, the bridge circuit 900 may include one or more trim resistances in addition to the sensor electrodes for balancing the first leg and the second leg. When the legs of the bridge circuit 900 are substantially balanced, the output voltage signal Vout will remain close to zero responsive to temperature changes, as each of the sensor electrodes respond similarly to temperature. However, the sensor electrodes may respond differently to changes in force such as applying a press or removing a press. Because the resistances 910 correspond to a positive gauge factor and the resistances 915 correspond to a negative gauge factor, the response of the bridge circuit 900 to changes in force corresponds to an effectively greater gauge factor and produces a greater change in the output voltage signal Vout.

In some embodiments, each of the resistances 910, 915 have substantially a same resistance value for a given force level (e.g., with no force applied). In such a configuration, the amplitude of the output voltage signal Vout reflects a greatest responsiveness of the bridge circuit 900. The response of the bridge circuit 900 tends to drop exponentially for different resistance values of the resistances 910, 915.

Figure 10:
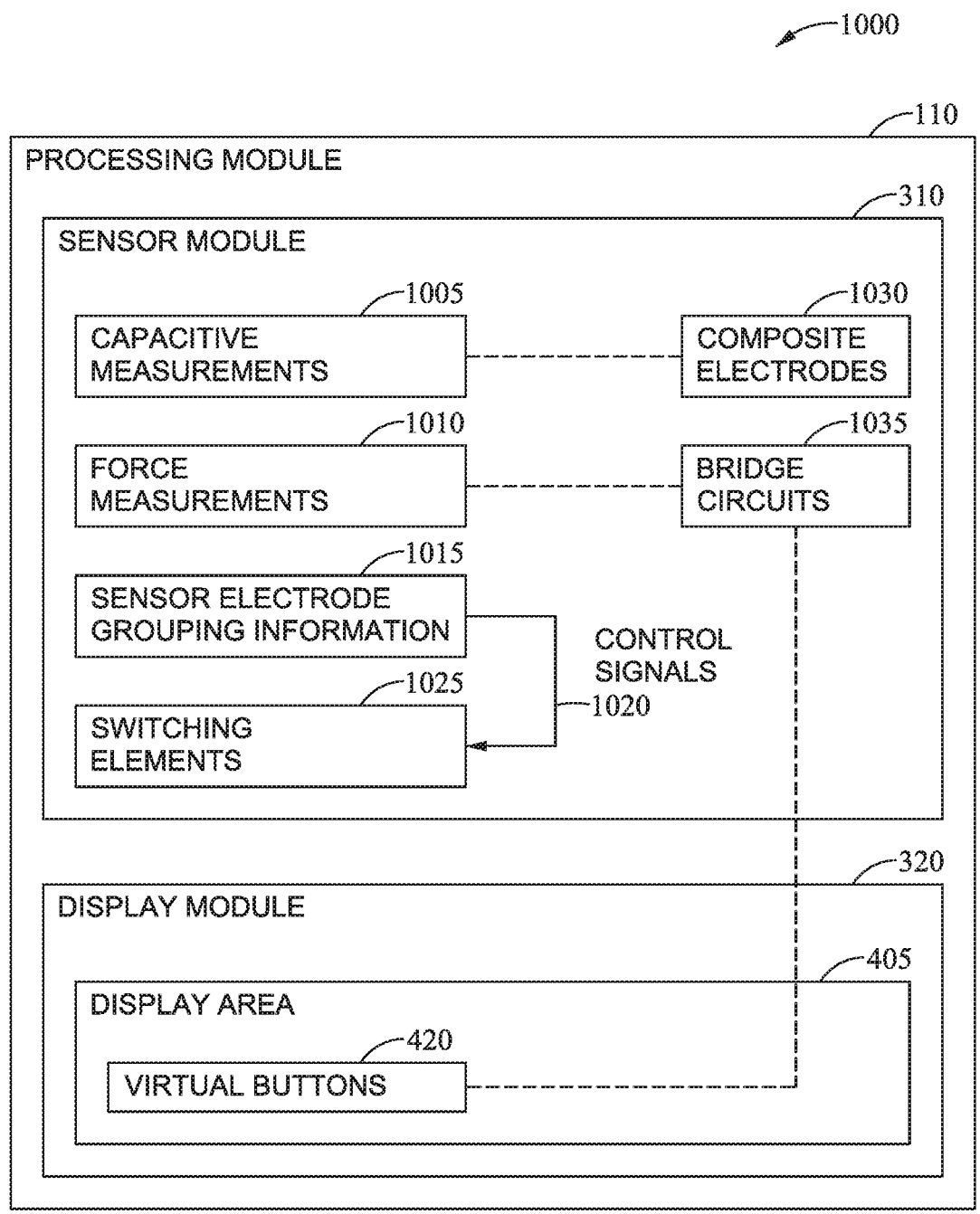
FIG. 10 is a diagram illustrating an exemplary processing system, according to embodiments described herein.

FIG. 10 is a diagram 1000 illustrating an exemplary processing system 110, according to embodiments described herein. The processing system 110 may be used in conjunction with other embodiments disclosed herein, such as any of the sensor electrode arrangements 500, 600, 700, 800.

The sensor module 310 is configured to acquire capacitive measurements 1005 and force measurements 1010 using a plurality of sensor electrodes coupled with the processing system 110. The sensor module 310 further comprises sensor electrode grouping information 1015 that is used to select groups of the plurality of sensor electrodes for acquiring the capacitive measurements 1005 and/or the force measurements 1010. For example, a plurality of sensor electrodes may be combined in a first arrangement for acquiring capacitive measurements 1005 with the processing system 110, and combined in a different second arrangement for acquiring force measurements 1010. In some embodiments, one or more bridge circuits 1035 are formed according to the sensor electrode grouping information 1015, and the force measurements 1010 are acquired using the one or more bridge circuits 1035. In some embodiments, one or more composite electrodes 1030 are formed according to the sensor electrode grouping information 1015, and the capacitive measurements 1005 are acquired using the one or more composite electrodes 1030. The composite electrodes 1030 generally include a first portion having a positive gauge factor, and a second portion connected with the first portion and having a negative gauge factor.

The sensor module 310 is configured to generate control signals 1020 based on the sensor electrode grouping information 1015. The control signals 1020 are used to operate a plurality of switching elements 1025 to couple particular sensor electrodes to form the groups specified by the sensor electrode grouping information 1015

The display module 320 is configured to drive display signals onto a plurality of display electrodes for updating a display area 405 of a display. The display module 320 is further configured to selectively display one or more virtual buttons 420 within the display area 405. In some embodiments, the bridge circuits 1035 are formed using the switching elements 1025 when the one or more virtual buttons 420 are displayed. The force measurements 1010 acquired using the bridge circuits 1035 are used to determine presence or absence of input at the one or more virtual buttons 420.

Figure 11:
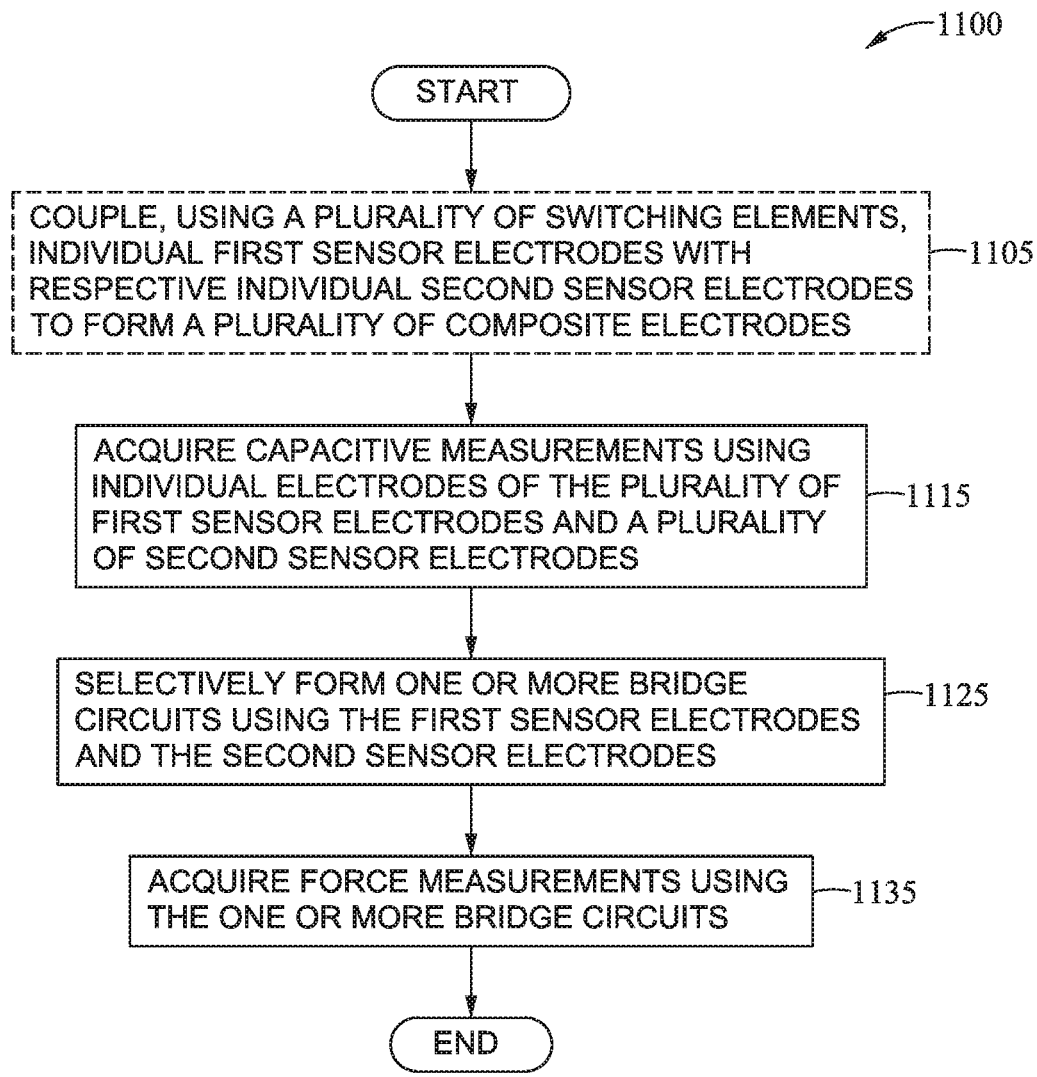
FIG. 11 is a method of operating sensor electrodes of different materials, according to embodiments described herein.

FIG. 11 is a method 1100 of operating sensor electrodes of different materials, according to embodiments described herein. The method 1100 may be used in conjunction with other embodiments disclosed herein, and may be performed using the processing system 110 illustrated in FIGS. 1, 3, and 10.

Method 1100 optionally begins at block 1105, where the processing system couples, using a plurality of switching elements, individual first sensor electrodes with respective individual second sensor electrodes to form a plurality of composite electrodes. The first sensor electrodes correspond to a first material having a positive gauge factor, and the second sensor electrodes correspond to a second material having a negative gauge factor. At block 1115, the processing system acquires capacitive measurements using individual electrodes of the plurality of first sensor electrodes and the plurality of second sensor electrodes. At block 1125, the processing system selectively forms one or more bridge circuits using the first sensor electrodes and the second sensor electrodes. At block 1135, the processing system acquires force measurements using the one or more bridge circuits. Method 1100 ends following completion of block 1135.

Thus, the embodiments and examples set forth herein were presented in order to best explain the embodiments in accordance with the present technology and its particular application and to thereby enable those skilled in the art to make and use the disclosure. However, those skilled in the art will recognize that the foregoing description and examples have been presented for the purposes of illustration and example only. The description as set forth is not intended to be exhaustive or to limit the disclosure to the precise form disclosed.

In view of the foregoing, the scope of the present disclosure is determined by the claims that follow.

What is claimed is:

1. An input device comprising:
a plurality of first sensor electrodes formed of a first material having a positive gauge factor;
a plurality of second sensor electrodes formed of a second material having a negative gauge factor; and
a processing system configured to:
acquire capacitive measurements using individual electrodes of the first sensor electrodes and the second sensor electrodes;
operate a first plurality of switching elements to selectively form one or more bridge circuits using the first sensor electrodes and the second sensor electrodes; and
acquire force measurements using the one or more bridge circuits.

2. The input device of claim 1, wherein the first material comprises a metal mesh material, and wherein the second material comprises an optically transmissive film material.

3. The input device of claim 1, wherein individual electrodes of a selected one of (i) the plurality of first sensor electrodes and (ii) the plurality of second sensor electrodes each define a macroscopically contiguous area, and wherein individual electrodes of the other of (i) and (ii) each define a macroscopically non-contiguous area.

4. The input device of claim 3, wherein individual sensor electrodes of the first sensor electrodes each define a macroscopically non-contiguous area,
wherein the individual sensor electrodes of the first sensor electrodes are serpentine shape electrodes formed of a metal mesh material,
wherein individual sensor electrodes of the second sensor electrodes each define a macroscopically contiguous area, and
wherein the individual sensor electrodes of the second sensor electrodes are plane shape electrodes formed of an optically transmissive film material.

5. The input device of claim 1, further comprising:
a second plurality of switching elements configured to:
couple individual first sensor electrodes with respective individual second sensor electrodes to form a plurality of composite electrodes, wherein the capacitive measurements are acquired using the composite electrodes; and
decouple the first sensor electrodes from the respective second sensor electrodes to acquire the force measurements.

6. The input device of claim 5, further comprising:
a plurality of third sensor electrodes configured to be operated as transmitter electrodes during transcapacitive sensing,
wherein the composite electrodes are configured to be operated as receiver electrodes during the transcapacitive sensing.

7. The input device of claim 6, wherein individual composite electrodes have substantially a same area as individual third sensor electrodes.

8. The input device of claim 1, further comprising:
a plurality of display electrodes, wherein at least one sensor electrode of the first sensor electrodes and the second sensor electrodes comprises at least one of the plurality of display electrodes.

9. The input device of claim 8, wherein the plurality of display electrodes corresponds to a display area of the input device, wherein selectively forming the one or more bridge circuits comprises:
selecting ones of the first sensor electrodes and of the second sensor electrodes to form one or more virtual buttons within the display area.

10. A processing system comprising:
a sensor module comprising sensor circuitry, the sensor module configured to:
acquire capacitive measurements using individual electrodes of a plurality of first sensor electrodes and a plurality of second sensor electrodes, the first sensor electrodes formed of a first material having a positive gauge factor, the second sensor electrodes formed of a second material having a negative gauge factor;
operate a first plurality of switching elements to selectively form one or more bridge circuits using the first sensor electrodes and the second sensor electrodes; and
acquire force measurements using the one or more bridge circuits.

11. The processing system of claim 10, wherein the first material comprises a metal mesh material, and wherein the second material comprises an optically transmissive film material.

12. The processing system of claim 10, wherein individual electrodes of a selected one of (i) the plurality of first sensor electrodes and (ii) the plurality of second sensor electrodes each define a macroscopically contiguous area, and
wherein individual electrodes of the other of (i) and (ii) each define a macroscopically non-contiguous area.

13. The processing system of claim 10, the sensor module further configured to:
couple, using a second plurality of switching elements, individual first sensor electrodes with respective individual second sensor electrodes to form a plurality of composite electrodes, wherein the capacitive measurements are acquired using the composite electrodes; and
decouple the first sensor electrodes from the respective second sensor electrodes to acquire the force measurements.

14. The processing system of claim 13, wherein acquiring capacitive measurements using individual electrodes comprises acquiring transcapacitive measurements by:
operating a plurality of third sensor electrodes as transmitter electrodes; and
operating the composite electrodes as receiver electrodes.

15. The processing system of claim 10, further comprising:
a display module comprising display circuitry configured to drive display signals onto a plurality of display electrodes for updating a display,
wherein at least one sensor electrode of the first sensor electrodes and the second sensor electrodes comprises at least one of the plurality of display electrodes.

16. The processing system of claim 15, wherein the plurality of display electrodes corresponds to a display area, wherein selectively forming the one or more bridge circuits comprises:
selecting ones of the first sensor electrodes and of the second sensor electrodes to form one or more virtual buttons within the display area.

17. A method comprising:
acquiring capacitive measurements using individual electrodes of a plurality of first sensor electrodes and a plurality of second sensor electrodes, the first sensor electrodes formed of a first material having a positive gauge factor, the second sensor electrodes formed of a second material having a negative gauge factor;
operating a first plurality of switching elements to selectively form one or more bridge circuits using the first sensor electrodes and the second sensor electrodes; and
acquiring force measurements using the one or more bridge circuits.

18. The method of claim 17, further comprising:
coupling, using a second plurality of switching elements, individual first sensor electrodes with respective individual second sensor electrodes to form a plurality of composite electrodes, wherein the capacitive measurements are acquired using the composite electrodes; and
decoupling the first sensor electrodes from the respective second sensor electrodes to acquire the force measurements.

19. The method of claim 18, wherein acquiring capacitive measurements using individual electrodes comprises acquiring transcapacitive measurements by:
operating a plurality of third sensor electrodes as transmitter electrodes; and
operating the composite electrodes as receiver electrodes.

20. The method of claim 17, further comprising:
driving display signals onto a plurality of display electrodes for updating a display, wherein at least one sensor electrode of the first sensor electrodes and the second sensor electrodes comprises at least one of the plurality of display electrodes.

* * * * *